(12) United States Patent
Liao

(10) Patent No.: US 6,337,444 B1
(45) Date of Patent: *Jan. 8, 2002

(54) WIRE WINDING BOX WITH REPLACEABLE CONNECTING RECEPTACLE

(76) Inventor: Sheng-Hsin Liao, No. 10, Alley 38, Lane 229, San Chun St., Shu Lin, Taipei Hsien (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/426,888

(22) Filed: Oct. 26, 1999

(30) Foreign Application Priority Data

Oct. 18, 1999 (TW) ...................................... 88216959 U

(51) Int. Cl.[7] ................................................ H02G 3/18
(52) U.S. Cl. ........................ 174/135; 174/69; 439/501; 439/502
(58) Field of Search ........................ 174/69, 175, 70 R, 174/72 C, 50–52; 439/501, 502

(56) References Cited

U.S. PATENT DOCUMENTS

| 4,179,179 A | * | 12/1979 | Lowden | 339/186 M |
| 4,384,688 A | * | 5/1983 | Smith | 242/107.7 |
| 5,684,883 A | * | 11/1997 | Chen | 381/187 |
| 5,906,506 A | * | 5/1999 | Chang et al. | 439/500 |
| 6,056,591 A | * | 5/2000 | Liao | 439/501 |
| 6,254,025 B1 | * | 7/2001 | Laio | 242/378 |

* cited by examiner

*Primary Examiner*—Dean A. Reichard
*Assistant Examiner*—W. David Walkenhorst
(74) *Attorney, Agent, or Firm*—Rosenberg, Klein & Lee

(57) ABSTRACT

A wire winding box of a replaceable connecting receptacle includes a wire winding box and a replaceable connecting receptacle. In the wire winding box, a rotary disk with a built-in spiral spring causes the wire on the rotary disk to be sustained in an elastic rewinding state. The wire controlled by the spiral spring within the wire winding device is connected to a universal plug having a unified type of audio/video signal terminal. One end of the connecting plug is an universal receptacle portion capable of being inserted an universal plug, while another end is a signal input/output portion of various type and signal input mode, such as a communication plug, an earphone, a mobile phone hand-free receiver, a USB, an ADSL connectors. Therefore, only one wire winding device matching with various replaceable connecting receptacle of various type, different communication, video/audio or computer and other electronic devices. Therefore, the useful life of a wire winding device is prolonged, the wire is not improperly wound but can be wound at the proper speed so that the use thereof is prolonged, moreover, manufacturing cost is reduced.

12 Claims, 6 Drawing Sheets

WIRE WINDING BOX WITH REPLACEABLE CONNECTING RECEPTACLE

FIELD OF THE INVENTION

The present invention relates to a wire winding box wit h a replaceable connecting receptacle, which is installed between various audio/video (A/V) devices, communication devices, computer and other electronic devices for adjusting the using distance so that the usable distance of a wire winding device is prolonged, the wire is avoid to be improperly wound but can be wound at proper timing so that the using field is widen, moreover, manufacturing cost is reduced.

BACKGROUND OF THE INVENTION

In the prior art communication devices such as wired phone, some communication wire with proper length is necessary to be installed between the telephone mainframe and receiver. In order that the communication wire is too long or too short so as to be improperly wound, some wire winding boxes are invented, such as that disclosed in Taiwan Patent Nos. 87214430, 88206807, 88207863, 88209138, 88209426, etc., or U.S. Pat. Nos. 5082448, 5796047, etc., which all are assigned to the assignee of the present invention. These wire winding boxes basically includes a housing, a rotary disk, a spiral spring, an d communication wires. The spiral spring serves to control the rotary disk. While the communication wire with one end connecting with a communication plug is wound around the rotary disk. Therefore, as the plugs at two ends are inserted into the spiral spring and a receiver, respectively, by the elastic force of the spiral spring, the wire can be pulled tightly. The receiver can be pulled to any proper length while the wire is sustained in a shortest length, or another buckling means is designed to control the length of the wire so that the wire will not be intricate.

Although such kinds of wire winding boxes are preferred, however, these wire winding boxes are designed only for one specific device but can not be used in other A/V, computer or other electronic devices. The reasons is that not only the communication transformation modes of the communication, A/V, and computers are different, but also different products of the same kind possibly have different communication transformation mode. Therefore, as the distal end of the wire winding box is connected with a fixed communication plug for communication device, then it can not be used in other electronic devices, such as A/V, or computer devices. Similarly, if it is connected to a communication plug used for A/V device, then it can not be used in communication, or computer devices. Namely, the plug type of a wire winding box is designed according to the specific confinement of electronic devices. Once it is manufactured, the use can not be modified. In other words, one wire winding box is only used for single one electronic devices. Not only the manufacturing cost is high, but also consumers are troublesome in buying, even some unnecessary waste is induced.

SUMMARY OF THE INVENTION

Accordingly, the primary object of the present invention is to provide a wire winding box with a replaceable connecting receptacle includes a wire winding box and a replaceable connecting receptacle. The wire controlled by a spiral spring within the wire winding device is connected to a universal plug having a unified type of audio/video signal terminal. One end of the connecting plug is a universal receptacle portion capable of being inserted by a universal plug, while another end is a signal input/output portion of various type and signal input mode, such as a communication plug, an earphone, a mobile phone hand-free receiver, a USB, an ADSL, an IEEE 1394 connectors. Therefore, by only one wire winding device, various replaceable connecting receptacle of various type and different communication, video/audio or computer and other electronic devices can be matched. Therefore, the usable distance of a wire winding device is prolonged, the wire is avoided to be improperly wound but can be wound at proper timing so that the using field is widen, moreover, manufacturing cost is reduced.

The various objects and advantages of the present invention will be more readily understood from the following detailed description when read in conjunction with the appended drawing.

DETAILED DESCRIPTION OF THE PREFERRED EMBODIMENTS

Figure 1:
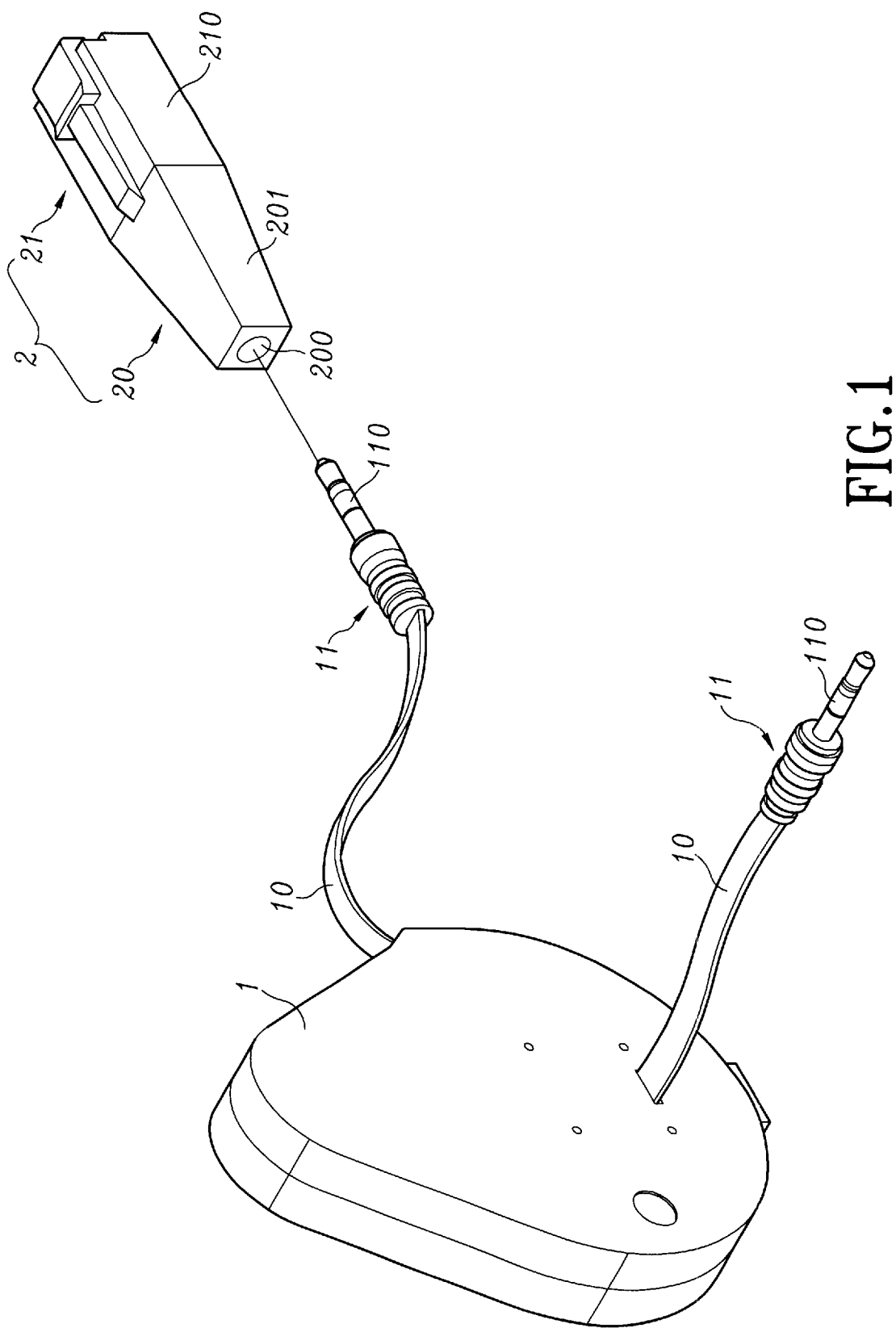
FIG. 1 is a schematic perspective view showing the use of the present invention in a communication plug.

With reference to FIG. 1, a perspective view for the embodiment of the wire winding box with a replaceable connecting receptacle of the present invention is illustrated. The present invention includes a wire winding box 1 and a replaceable connecting receptacle 2.

In the wire winding box 1, a rotary disk with a built-in spiral spring causes the wire on the rotary disk to be sustained in an elastic rewinding state. The structure of the wire winding box has been disclosed in many patent publications, and some have been sold in market, thus, the detail will not be described herein. In the two extending wires 10 of the wire winding box 1, at least one has an end portion being connected to an universal receptacle 11. The universal receptacle 11 has a structure such as that shown in the figure which is a general multiple polarity audio/video signal terminal (for example, three or four polarities) 110.

Figure 2:
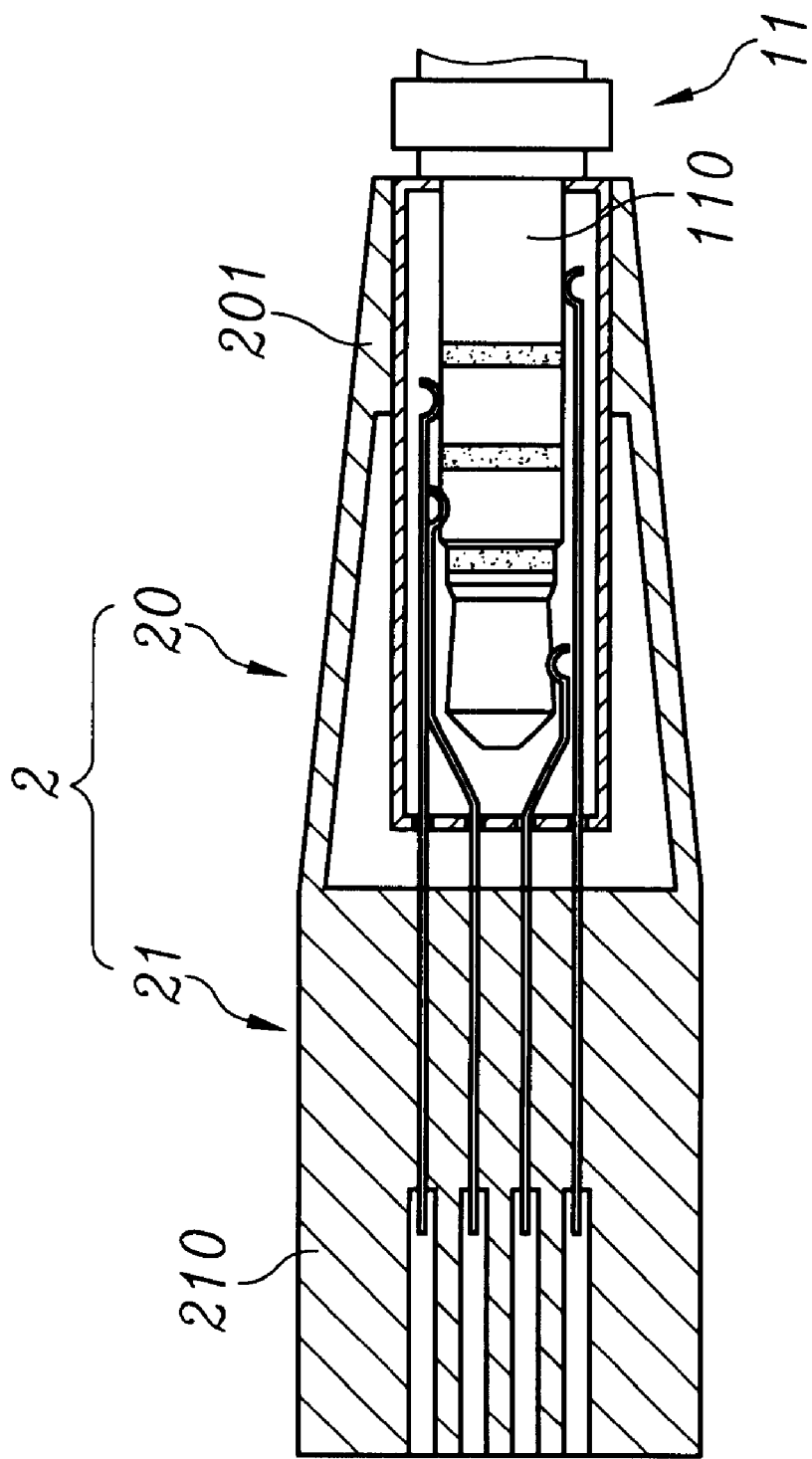
FIG. 2 is a schematic cross sectional view showing the insertion of an universal plug and a connecting receptacle as the present invention is used in a communication plug.

One end of the replaceable connecting receptacle 2 is a universal receptacle portion 20 with inserting hole 200 for being inserted by the universal receptacle 11 to achieve an electric connection. A multiple polarity audio/video signal plug 201 can be made by using the aforesaid multiple polarity audio/video signal terminal 110, as shown in FIG. 2. The connecting receptacle 2 has another end which is a signal input/output portion 21 which may be made as a general used communication receptacle 210 used in telephones, networks, and other communication devices, as shown in FIG. 1. Therefore, the wire winding device 1 can be connected to be used in telephone mainframe or other receiver, or connected between a computer and a network receptacle for extending usable distance and avoiding the improper winding of the wire 10. Furthermore, the wire 10 can be rewound at proper time.

Figure 3:
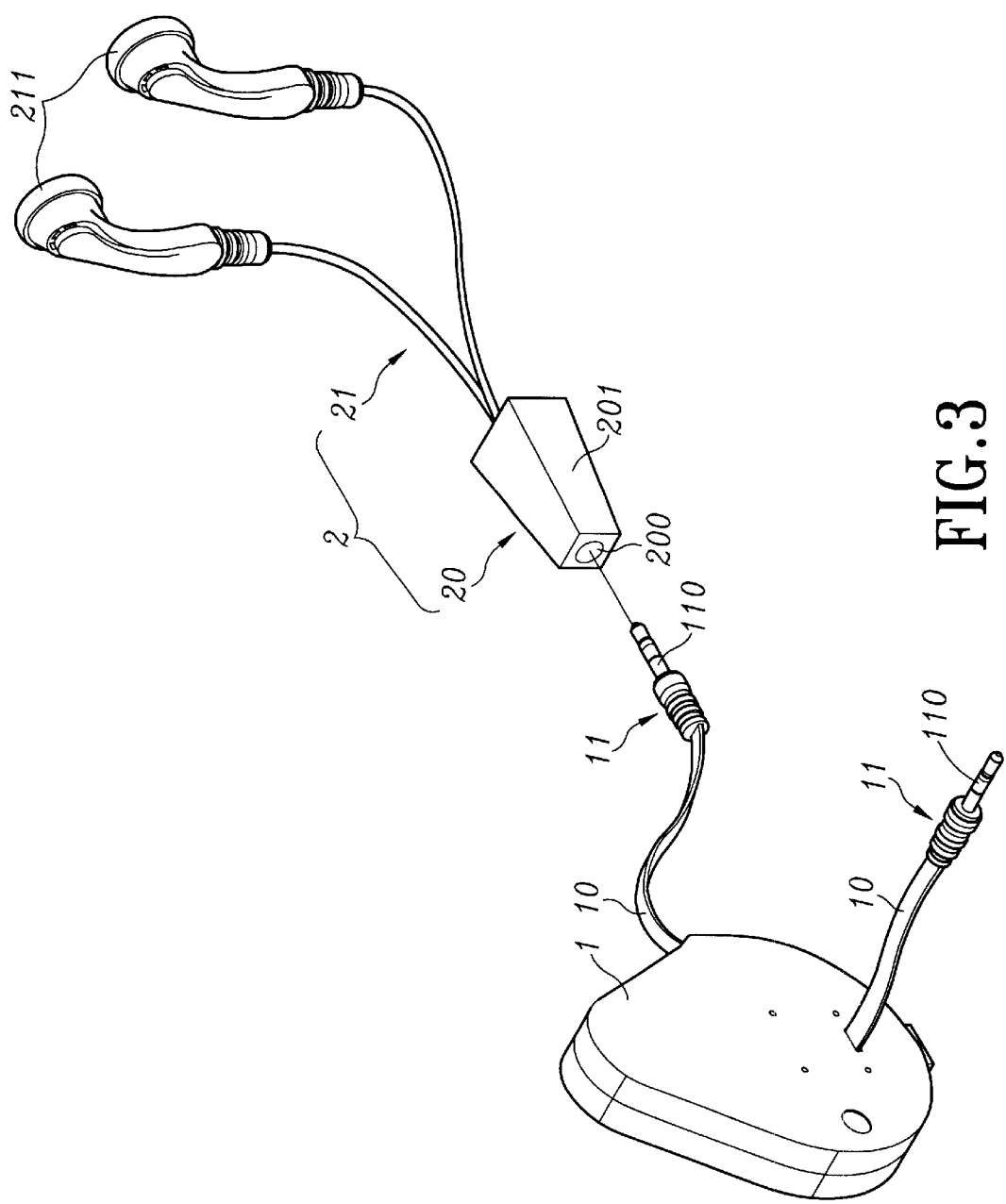
FIG. 3 is a schematic perspective view showing that the present invention is suitable to be used in an earphone.

As shown in FIG. 3, the signal I/O (input/output) portion 21 can be made as a general earphone 211. Then the wire winding device 1 can be used in stereo, mobile audio device, and other devices. Thus, usable distance of the earphone 211 can be extended and the wire 10 is avoided to be rewound. Furthermore, the wire 10 can be rewound for being arranged in order.

Figure 4:
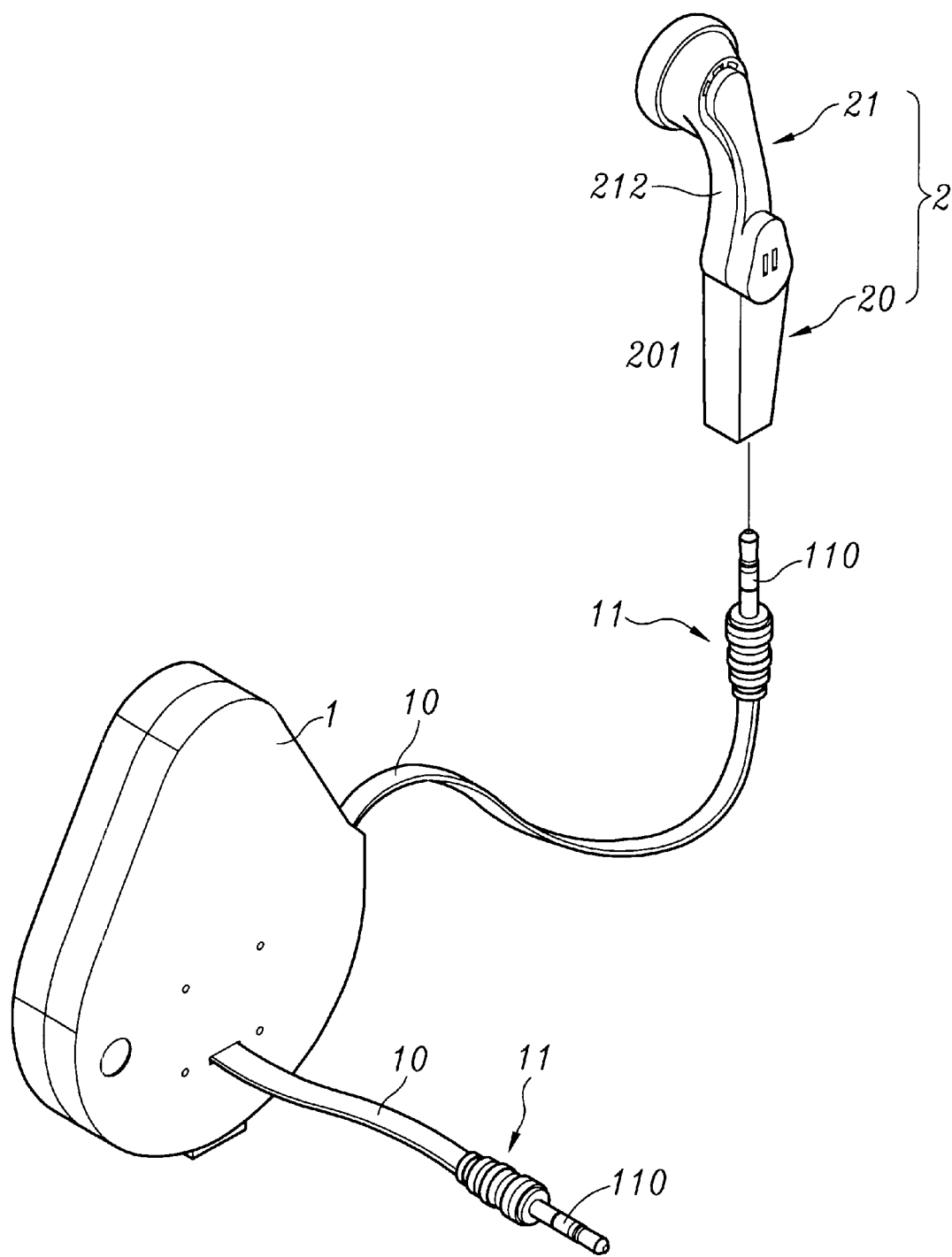
FIG. 4 is a schematic perspective view showing that the present invention is suitable to be used in a mobile phone hand free receiver.
Figure 5:
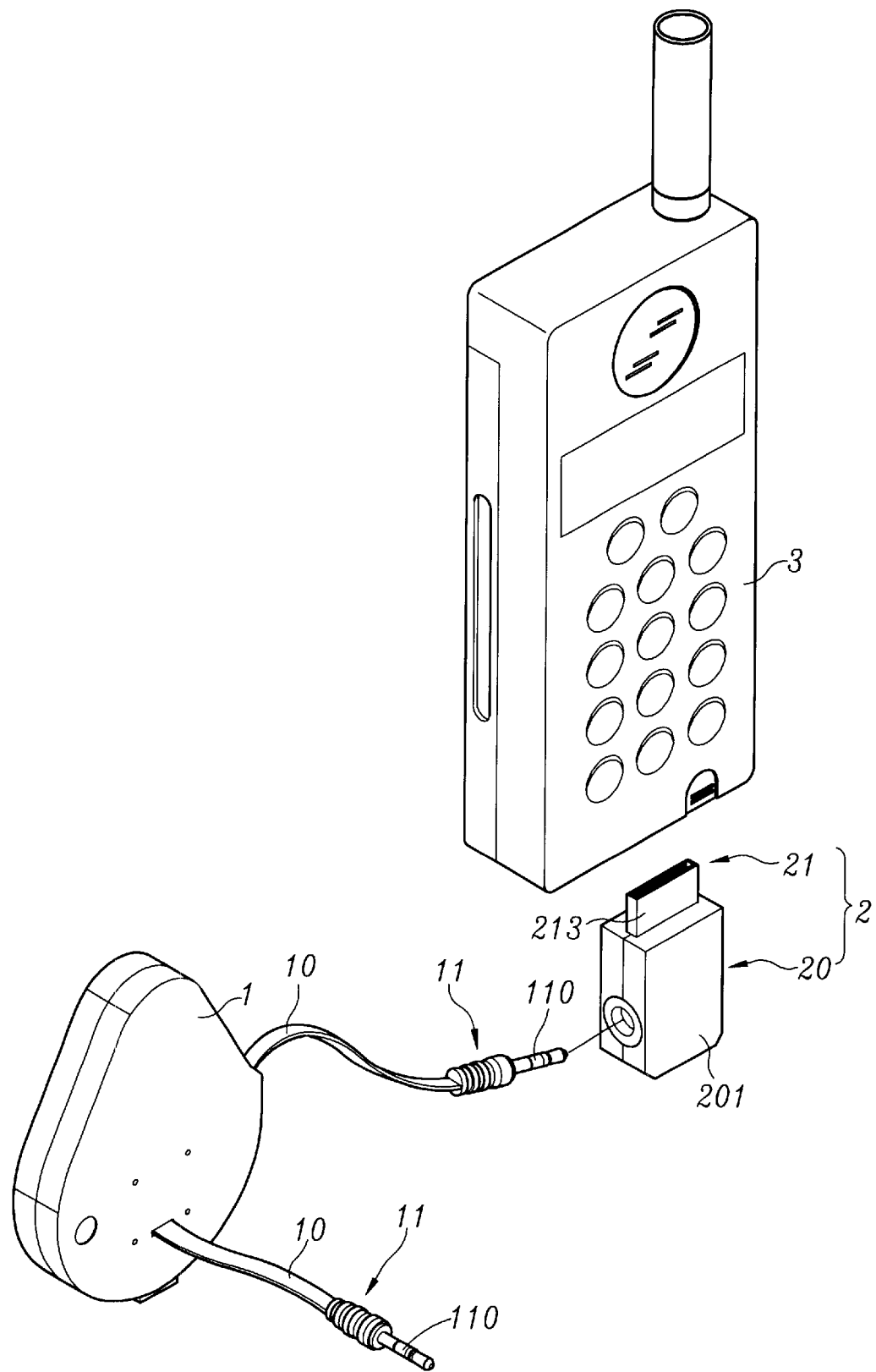
FIG. 5 is a schematic perspective view showing that the present invention is suitable to be used in a mobile phone hand free receiver plug.

As shown in FIG. 4, the signal I/O portion 21 can be made as a mobile phone hand-free receiver 212 with an earphone type microphone 21, or as shown in FIG. 5, made as a hand-free receiver receptacle 213. Thus, the wire winding device 1 can be used in a mobile phone 3 for extending the usable distance of the hand-free receiver 212 and avoiding the improper winding of the wire 10. Moreover, wire 10 can be rewound at proper time.

Figure 6:
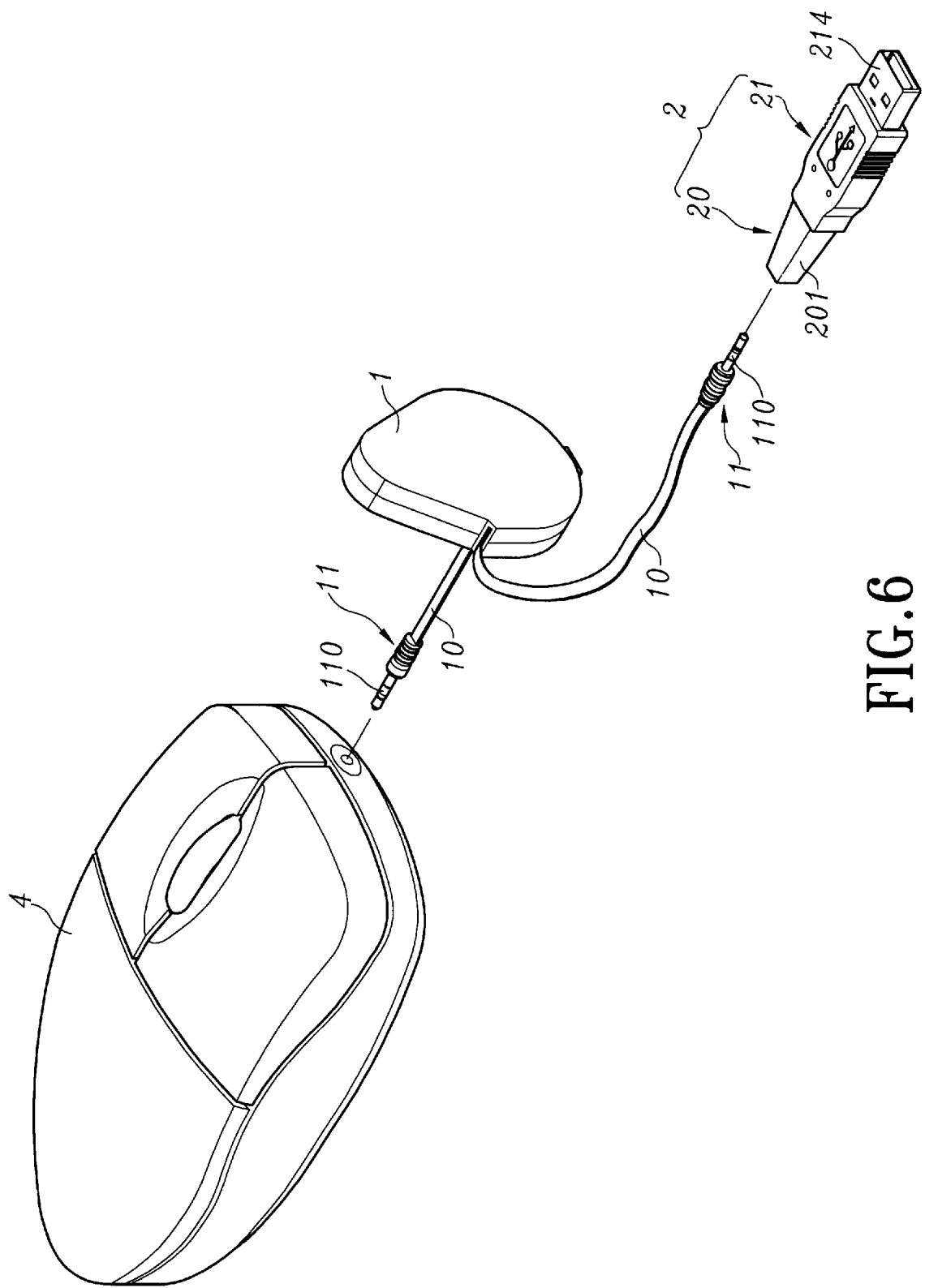
FIG. 6 is a schematic perspective view showing that the present invention is suitable to be used in a USB connector.

As shown in FIG. 6, the signal I/O portion 21 can be made as an universal serial bus (USB) connector 214 used in a general computer. Therefore, the wire winding device 1 can be used between a computer mainframe and a peripheral hardware device, such as mouse 4, keyboard, etc. shown in FIG. 6 for extending the usable distance of the peripheral hardware device and avoiding the improper winding of the wire 10. Moreover, wire 10 can be rewound at proper time.

The signal I/O portion 21 can be made as an asymmetric digital subscriber loop ADSL connector used by a wide band network, or as an IEEE 1394 high frequency transmission interface connector specified by IEEE (Institution of Electrical and Electronic Engineering).

In summary, in the wire winding box with a replaceable connecting receptacle, an universal receptacle and various replaceable connecting receptacles serves to cause a single wire winding box can be widely used in various communication, AV, computer and other electronic devices. Therefore, cost is reduced.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wire winding box device with a replaceable connecting receptacle comprising:

a wire winding box having two wires which can be pulled out and wound for storage, each of said two wires having an end portion connected to a multiple polarity audio/video signal terminal; and, a replaceable connecting receptacle having, an audio/video signal receptacle portion at one end thereof matched to the audio/video signal terminals for insertion of the audio/video signal terminal of one of said wires to achieve an electric connection therebetween, an opposing, end of the replaceable connecting receptacle being a signal input/output (I/O) portion.

2. The wire winding box device with a replaceable connecting receptacle as claimed in claim 1, wherein the signal I/O portion of the replaceable connecting receptacle is an earphone.

3. The wire winding box device with a replaceable connecting receptacle as claimed in claim 1, wherein the signal I/O portion of the connecting receptacle is a communication plug matching with communication devices.

4. The wire winding box device with a replaceable connecting receptacle as claimed in claim 1, wherein the signal I/O portion of the connecting receptacle is a hand-free receiver used in mobile phones.

5. The wire winding box device with a replaceable connecting receptacle as claimed in claim 1, wherein the signal I/O portion of the connecting receptacle is a hand-free receiver plug used in mobile phones.

6. The wire winding box device with a replaceable connecting receptacle as claimed in claim 1, wherein the signal I/O portion of the connecting receptacle is a universal serial bus connector.

7. The wire winding box device with a replaceable connecting receptacle as claimed in claim 1, wherein another wire of the wire winding box is connected to a computer mouse.

8. The wire winding box device with a replaceable connecting receptacle as claimed in claim 1, wherein another wire of the wire winding box is connected to a computer keyboard.

9. The wire winding box device with a replaceable connecting receptacle as claimed in claim 1, wherein the signal I/O portion of the connecting receptacle is an asymmetric digital subscriber loop (ADSL) used in wide band network.

10. The wire winding box device with a replaceable connecting receptacle as claimed in claim 1, wherein the signal I/O portion of the replaceable connecting receptacle is an high frequency transmission interface connector.

11. A wire winding box device with a replaceable connecting receptacle comprising:

a wire winding box having two wires which can be pulled out and wound for storage, each of said two wires having an end portion connected to an audio/video signal terminal, the audio/video terminal having four poles;

at least one replaceable connecting receptacle having an audio/video signal receptacle portion at one end thereof matched to the audio/video signal terminals for insertion of a corresponding one of the audio/video signal terminals, the audio/video signal receptacle portion having four contacts to achieve an electric connection with the four poles of the corresponding audio/video signal terminal, an opposing end of the connecting receptacle having an earphone and microphone incorporated therein.

12. A wire winding box device with a replaceable connecting receptacle comprising:

a wire winding box having two wires which can be pulled out and wound for storage, each of said two wires having an end portion connected to an audio/video signal terminal, the audio/video terminal having four poles;

at least one connecting receptacle having an audio/video signal receptacle portion at one end thereof matched to the audio/video signal terminals for insertion of a corresponding one of the audio/video signal terminals, the audio/video signal receptacle portion having four contacts to achieve an electric connection with the four poles of the corresponding audio/video signal terminal, an opposing end of the connecting receptacle having a connection configuration selected from the group consisting of a universal serial bus connector, an asymmetric digital subscriber loop connector, and a high frequency transmission interface connector.

* * * * *